United States Patent [19]

Richards et al.

[11] Patent Number: 4,719,945

[45] Date of Patent: Jan. 19, 1988

[54] HOSE WITH COMPOSITE JOINTS

[75] Inventors: Toby D. Richards, Morris Plains; Anthony I. Antonio, Jr., Bridgewater, both of N.J.

[73] Assignee: Fabricated Plastics, Inc., Morristown, N.J.

[21] Appl. No.: 938,551

[22] Filed: Dec. 5, 1986

[51] Int. Cl.⁴ .............................................. F16L 11/11
[52] U.S. Cl. ..................................... 138/154; 138/129
[58] Field of Search ................ 138/154, 121, 122, 129; 156/143, 195

[56] References Cited

U.S. PATENT DOCUMENTS

| | | | |
|---|---|---|---|
| 2,739,089 | 3/1956 | Hageltorn . | |
| 3,195,427 | 7/1965 | Adams | 156/195 |
| 3,199,541 | 8/1965 | Richitelli | 138/129 |
| 3,273,600 | 9/1966 | Swan | 138/122 |
| 4,121,624 | 10/1978 | Chen | 138/154 |
| 4,291,728 | 9/1981 | Cothran | 138/122 |
| 4,337,800 | 7/1982 | Carlson et al. | 138/122 |
| 4,383,555 | 5/1983 | Finley | 138/129 |
| 4,420,019 | 12/1983 | Dillon | 138/129 |
| 4,587,145 | 5/1986 | Kanao | 138/129 |
| 4,589,448 | 5/1986 | del Valle | 138/122 |

*Primary Examiner*—Henry J. Recla
*Assistant Examiner*—L. J. Peters
*Attorney, Agent, or Firm*—Lerner, David, Littenberg, Krumholz & Mentlik

[57] ABSTRACT

The elongated members used in making a spiral wound hose are formed from a relatively high melting structural material but provided with a more readily fusible melting buffer material, typically as a thin layer overlying the structural material. The molten bonding material applied to the elongated members during the spiral winding process bonds well with the buffer material. The hose has enhanced structural strength and integrity.

12 Claims, 4 Drawing Figures

HOSE WITH COMPOSITE JOINTS

BACKGROUND OF THE INVENTION

The present invention pertains to hoses and hose manufacturing methods.

Flexible plastic hoses have been made heretofore by winding one or more elongated members formed from polymeric structural materials into a helical structure. Portions of the members on adjacent turns of the helix, referred to herein as "connecting portions," are juxtaposed with one another. The juxtaposed connecting portions typically are secured to one another by a polymeric bonding material, also referred to as a "hot melt". The molten bonding material ordinarily is applied to a connecting portion of a member as that member is wound into the helical structure.

As illustrated, for example, in Richitelli, U.S. Pat. No. 3,199,541, a helically wound hose can be made from a single strip-like member having a U-shaped channel on one edge and a projection on the opposite edge, the member being wound so that the projection on each turn of the member engages the channel on the next turn. In such a construction, the molten bonding material can be deposited in the channel as the member is wound into the helix, and, when cooled, will bond both to the channel and to the engaged projection on the adjacent turn. Another form of helically wound hose employs a channel member and a cap member wound in alternating turns. Typically, both the channel member and the cap member are generally U-shaped in cross-section and are wound so that a first sidewall of one turn of the channel member and a second sidewall of another turn of the channel member are received within the U-shaped cap member. Molten bonding material usually is deposited within the U-shaped cap member during the winding operation. Thus, the bonding material first contacts the interior surfaces of the cap member and then contacts the sidewalls of the channel member as the same enter into the slot defined by the cap member during the winding operation. When the bonding material cools, it solidifies and bonds the mating portions of the channel and cap member together. Hoses made with a "channel and cap" construction are disclosed, for example, in Dillon, U.S. Pat. No. 4,420,019.

Spiral-wound hoses constructed according to these general methods have been used in a wide variety of applications heretofore, such as vacuum cleaner hoses, swimming pool skimmer hoses, flexible low-pressure piping and the like. However, spiral-wound hoses heretofore have been made from relatively soft, low-melting polymeric materials such as ethylene vinyl acetate (EVA). These materials are readily susceptible to fusion under heat and pressure. It has not been practicable heretofore to fabricate spiral-wound hoses with elongated members formed principally or entirely from relatively rigid high melting and difficult to fuse polymeric materials such as high density polyethylene, linear low-density polyethylene, while still employing the molten bonding material technique.

SUMMARY OF THE INVENTION

One aspect of the present invention incorporates the realization that the difficulties encountered with relatively difficult to fuse polymeric structural materials heretofore can be overcome, without sacrificing any of the strength benefits afforded by such materials, if a buffer material more readily susceptible to fusion under heat and/or pressure than the structural material is fused to the structural material of a connecting portion before the winding process.

A hose making method according to this aspect of the present invention preferably comprises the step of providing one or more elongated members, each having at least one connecting portion extending lengthwise along the member, at least one such connecting portion being formed from a polymeric structural material and at least one of the connecting portions have fused thereto a polymeric buffer material more readily fusible than the structural material. Thus, the buffer material preferably has a lower melting temperature than the structural material, and preferably is softer than the structural material. A molten polymeric bonding material having a melting temperature lower than that of the structural material, and typically lower than that of the buffer material, is applied to at least one of the connecting portions and the one or more members are wound into a generally helical configuration so that the members form a plurality of turns with the connecting portions of adjacent turns juxtaposed. In the wound structure, the bonding material extends between the juxtaposed connecting portions and contacts the buffer material. The bonding material is solidified, as by cooling, and thus bonds to the connecting portions. The bonding material bonds to at least one of the connecting portions by way of the buffer material.

Preferably, the buffer material is present in the form of a relatively thin layer, typically between about 0.002 and about 0.030 in. thick, on one or more of the connecting portions. The buffer material preferably is fused with the structural material during production of the elongated members, as in a coextrusion operation. Each member per se, aside from the buffer material, preferably is formed entirely from the structural material. Thus, the proportion of buffer material in the hose structure is relatively minor. However, this minor amount of the buffer material has a major effect on the strength of the joint achieved in the process.

The buffer material and the bonding material should be compatible. As used in this disclosure, with reference to two polymeric materials, the term "compatible" means that the two materials are capable of bonding to one another under the influence of heat and pressure. In some embodiments of the invention, these materials may include polymers which contain a common monomer. Particularly preferred materials are selected from the group consisting of ethylene polymers and ethylene copolymers, i.e., polymers which can be prepared from ethylene, with or without other monomers. In preferred combinations, the members are formed from structural materials consisting essentially of relatively rigid ethylene polymers or copolymers such as linear low-density polyethylene ("LLDPE") and alloys of high-density polyethylene ("HDPE") and ethylene vinyl acetate ("EVA"), the buffer materials and the bonding material consist essentially of relatively soft, readily fusible polymers such as ethylene ethyl acrylate ("EEA") and/or EVA.

In processes where the molten bonding material is applied to a first connecting portion on one of the members and the second or mating connecting portion on the same or another one of the members is subsequently brought into engagement with the first connecting portion, it is highly preferred to have the buffer material present on the second connecting portion, and most preferred to have the buffer material present on both connecting portions. Stated another way, the buffer material should be provided at least on the connecting portion which is brought into contact with the bonding material later in the assembly process. The results achieved according to this preferred aspect of the present invention ordinarily are superior to those achieved where the buffer material is provided only on the connecting portion which contacts the bonding material first. Although the present invention is not limited by any theory of operation, it is believed that the superior results relate to the cooling of the bonding material. Thus, the bonding material, when first applied to one of the connecting portions, typically is at a high enough temperature to bond well even with a structural material which is relatively difficult to fuse. By the time the second or mating connecting portion is engaged with the bonding material, the bonding material is ordinarily too cold to form a satisfactory bonds with the structural material but is still warm enough to form a satisfactory bond with the buffer material. Equally good or even better results are achieved where the buffer material is present on all of the connecting surfaces, including the connecting surface on which the molten bonding material is first applied.

Where a channel and cap hose is to be made, the bonding material ordinarily is deposited in the U-shaped cap member before the sidewalls of the channel member are engaged within the cap member during the winding process. Thus, each portion of the bonding material first contacts the interior surfaces of the cap member and subsequently contacts surfaces of the channel member. In this process, it is most preferred to provide the buffer material on the surfaces of the channel member sidewalls, or else both on the channel member sidewall surfaces and on the interior surfaces of the cap member.

The present invention also provides improved hoses having the improved bond strength imparted by the buffer material. Thus, in a hose according to this aspect of the present invention, the buffer material is interposed between the bonding material and the structural material of at least one of the connecting portions on at least one of the helically wound members. This aspect of the present invention provides hoses with combinations of flexibility and structural strength which have not been readily attainable heretofore. Particularly preferred hoses according to this aspect of the present invention have bonds with the strength needed to effectively use the structural strength of polymers such as LLOPE, HDPE/EVA blends and the like.

These and other objects, features and advantages of the present invention will be more readily apparent from the following detailed description of the preferred embodiments taken in conjunction with the accompanying drawings.

DETAILED DESCRIPTION OF THE PREFERRED EMBODIMENTS

Figure 1:
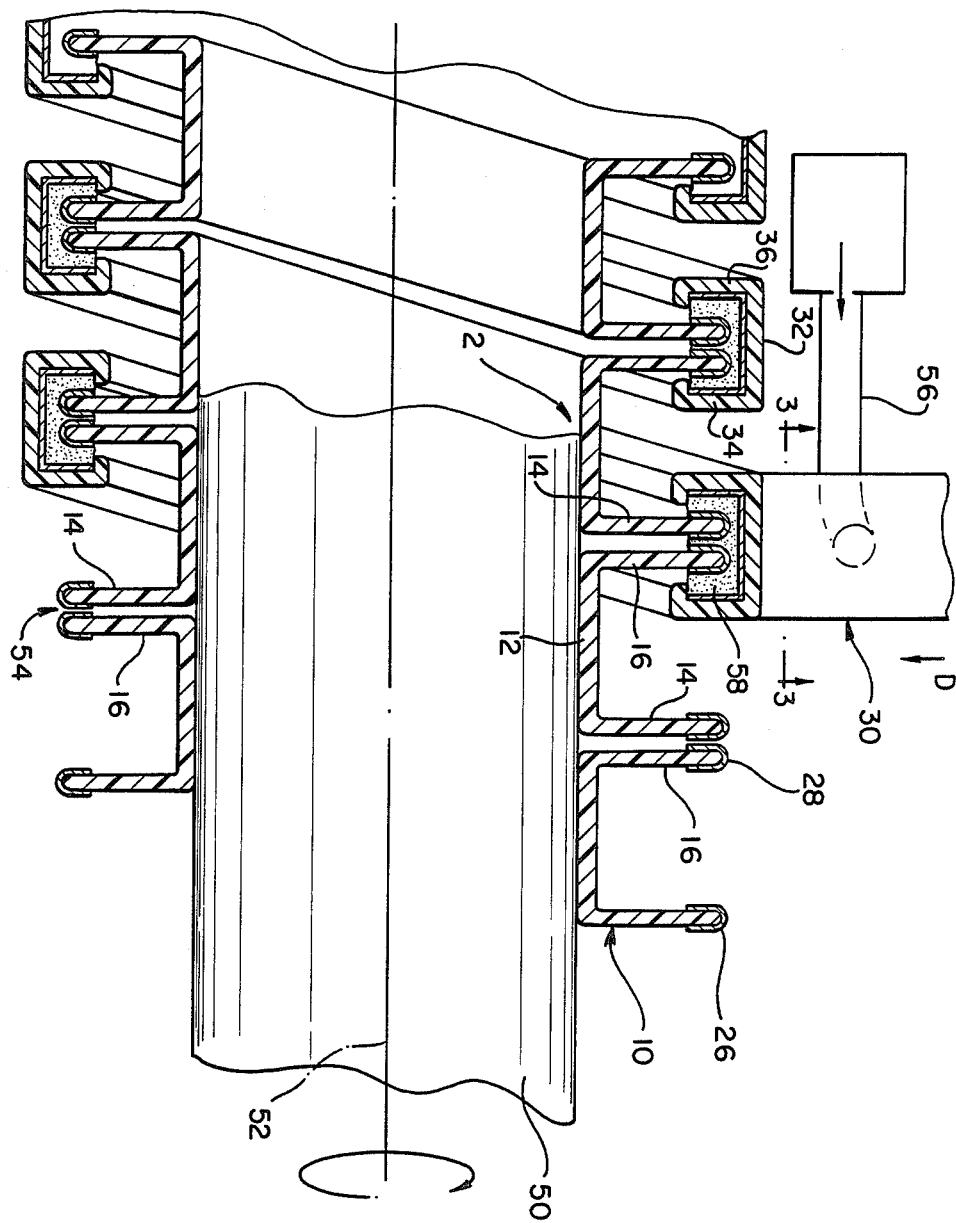
FIG. 1 is a schematic sectional view showing portions of a hose during a hose manufacturing process according to one embodiment of the present invention.

A channel member 10 (FIG. 2) employed in a hose making method according to one embodiment of the present invention is generally U-shaped in section. Unless otherwise indicated, descriptions in this disclosure of the shape of an elongated member "in section" should be understood as referring to the shape of the member viewed in a cross section taken on a cutting plane transverse to its direction of elongation. Ordinarily, although not necessarily, the elongated members are of substantially uniform cross section shape throughout their length.

Channel member 10 has a base wall 12, a first sidewall 14 and a second sidewall 16, the first and second sidewalls projecting generally codirectionally from base wall 12. First and second sidewalls 14 and 16 have interior surfaces 18 and 20, respectively, facing toward one another. Sidewalls 14 and 16 also have edges 22 and 24, remote from base wall 12. As will be explained further hereinbelow, those portions of sidewalls 14 and 16 adjacent edges 22 and 24 will be engaged with the bonding material, and these portions of channel member 10 constitute the connecting portions of the channel member.

The channel member itself is formed entirely from a relatively high melting, difficult to fuse structural material, in this case linear low density polyethylene (LLDPE). However, the channel member is provided with layers 26 and 28 of a more readily fusible, lower melting buffer material, in this case ethylene ethyl acrylate (EEA), on its connecting portions. Each of these layers 26 and 28 of buffer material overlies the relatively high melting structural material and is fused thereto.

The channel member can be formed from the structural material, and the overlying layers of buffer material can be fused with the structural material, in a coextrusion process. As the process of coextrusion per se is conventional and well known to those skilled in the plastics arts, this process need not be described herein. The coextrusion process typically brings each material to a liquid state and unites the flowing liquid streams. In coextrusion, the heat and pressure which may be applied to cause fusion of the buffer material with the structural material are limited only by the degradation temperature of the materials and the capacity of the equipment. Because conditions of heat and pressure far more severe than those attainable during the hose wind operation can be applied during the coextrusion operation, the structural material and buffer material can be readily united during coextrusion.

For clarity of illustration, the thickness of layers 26 and 28 has been greatly exagerated. Preferably, the thickness of these layers is as small as practicable with ordinary coextrusion techniques, ordinarily between about 0.002 and about 0.030 in. and more preferably between about 0.006 and about 0.015 in. Layers 26 and 28 cover the edges 22 and 24, respectively, of the associated sidewalls on the channel member and extend onto the interior surfaces 18 and 20, respectively of the sidewalls.

Figure 2:
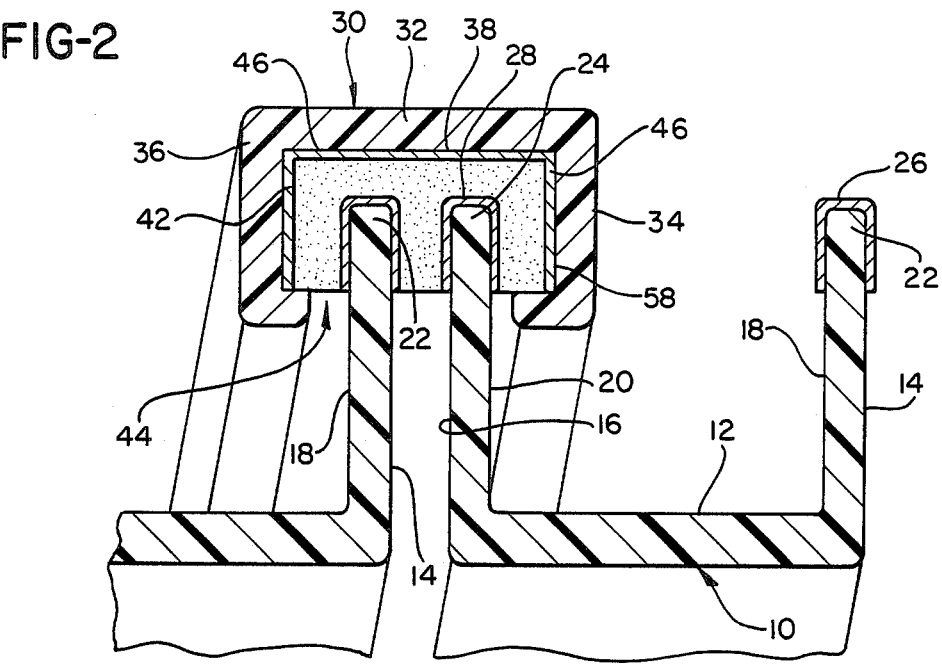
FIG. 2 is a fragmentary view taken on an enlarged scale of the area indicated in FIG. 1.

A U-shaped cap member 30 is also employed in the process. Cap member 30 has a crown wall 32 and lateral walls 34 and 36 projecting generally codirectionally from the crown wall. The crown wall 32 and lateral walls 34 and 36 have interior surfaces 38, 40 and 42, respectively, the interior surfaces 40 and 42 of the lateral walls facing towards one another, the interior surface 38 of the crown wall facing towards the lateral walls 34 and 36. The interior surfaces 38, 40 and 42 cooperatively define a slot 44. The walls 32, 34 and 36 of cap member 30 are formed entirely from a relatively high melting structural material, in this case the same linear low density polyethylene-based material as employed in channel member 10. The cap member, however, is provided with a layer of buffer material 46 overlying the structural material on the interior surfaces 38, 40 and 42 and hence overlying the structural material on the connecting portions of the cap member. Layer 46 includes the same EEA-based buffer material as incorporated in layers 24 and 26, and is of like thickness. As indicated in FIG. 2, layer 4 covers the entire interior surfaces 38, 40 and 42 of cap member 30. Cap member and layer 46 of buffer material may be formed and fused to one another by a coextrusion process which, in and of itself, is conventional and hence need not be described here.

The channel member 10 with buffer material layers 26 and 28 already thereon is wound on a generally cylindrical mandrel 50 (FIG. 1) having an axis 52 so that the channel member is formed into a plurality of turns and hence into a helix extending along axis 52. The sidewalls of neighboring turns of channel member 10 are juxtaposed with one another, so that the first sidewall 14 of one turn of the channel member is juxtaposed with the second sidewall 16 of the neighboring turn. Each such pair of juxtaposed channel member sidewalls defines a ridge 54, which extends along the helix defined by the channel member. Cap member 30 is wound onto the partially formed helix defined by the channel member, i.e., so that the ridge 54 defined by neighboring turns of the channel member enters into the slot 44 (FIG. 2) of channel member 30. Thus, in the finished helical structure, the turns of cap member 30 are arranged generally in alternating fashion with turns of cap member 10, so that each turn of cap member 30 bridges two neighboring turns of channel member 10. Also, as best seen in FIG. 2, the first sidewall 14 of one turn of channel member 10 and the second sidewall 16 of a neighboring turn of the channel member are both received in the slot 44 of each turn of cap member 30. The interior faces 18 and 20 of the channel member sidewall face towards the interior faces 42 and 40, respectively, of the cap member sidewalls. As best appreciated with reference to FIG. 1, the base wall 12 of the channel member lies towards the inside of the helix, i.e., towards axis 52, and sidewalls 14 and 16 of the channel member project generally in a radially outward direction, towards the outside of the helix, Conversely, the cap member 30 is disposed generally on the outside of the helix, with crown wall 32 lying at the outside of the helix and lateral walls 34 and 36 projecting generally inwardly, towards the inside of the helix.

Figure 3:
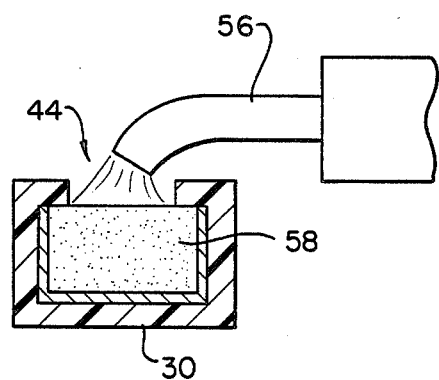
FIG. 3 is a schematic sectional view taken along line 3—3 in FIG. 1.

As cap member 30 is wound onto the helix, successive portions of the cap member are pulled onto the helix, moving generally in a downstream direction towards the growing helix as indicated by the arrow D in FIG. 1. As each portion of the cap member moves downstream, it passes a depositing station 56, where a molten bonding material 58 is deposited in slot 44 (FIG. 3). Thus, the molten bonding material 58 is applied concomitantly with the winding process, and is introduced into each portion of cap member 30 shortly before that portion of the cap member receives the sidewalls of the channel member in the helical winding process. The bonding material substantially fills slot 44, and the edges 22 and 24 of the sidewalls 14 and 16 on the channel member plunge into the filled slot and hence into the bonding material under pressure exerted by tension applied to member 30. The bonding material progressively cools and solidifies, and bonds the edge regions of walls 14 and 16 to the interior surfaces of the cap member and to one another. As best seen in FIG. 2, the bonding material is effectively fused to each of these edge regions and interior surfaces through the overlying thin layer of buffer material. Buffer material layers 26 and 28 in this embodiment cover about 50% to about 100% by area of those portions of sidewalls 14 and 16 which are immersed in the bonding material 58. Thus, the extent of each layer 26 and 28 along sidewall 14 or 16 in the direction toward base wall 10 is approximately equal to the depth of the slot 44 in cap member 30.

The bonding material in this embodiment consists essentially of ethylene vinyl acetate (EVA). The bonding material desirably is at a temperature between about 400° and about 600° F. when introduced into the cap member. The cap member and channel member should be at at least about room temperature when they contact the bonding material. Also, the bonding material should be introduced into each portion of the hose no more than about two seconds before that portion of the cap member is engaged with the channel member. Extraordinary bond strength is developed between the bonding material and the channel member as well as between the bonding material and the cap member. Thus, the finished hose is rugged and permits full exploitation of the strength inherent in the structural materials.

As will be readily appreciated, numerous variations and combinations of the features described above can be utilized. Thus, the size and relative proportions of the members can be varied. Also, with a winding process as illustrated, where the bonding material contacts the cap member prior to contacting the channel members, the layer 46 of buffer material on the connecting portions of the cap member 30 can be omitted without severe loss of strength. The bonding material in this case is relatively hot when it first contacts the cap member, and hence is at a temperature sufficient to bond reasonably well to the structural material of the cap member. Conversely, the process can be reversed so that the molten bonding material is applied to ridge 54 of the helix and the cap member 30 is then placed onto the molten bonding material. In this reversed process, the bonding material will contact the connecting regions of the channel member first. Therefore, in the reversed process, the buffer material can be omitted from the connecting portions of the channel member but should be present on at least a part of the connecting regions of the cap member, viz, on at least some part of at least one of interior surfaces 40, 38 or 42, and preferably on all of these surfaces.

Figure 4:
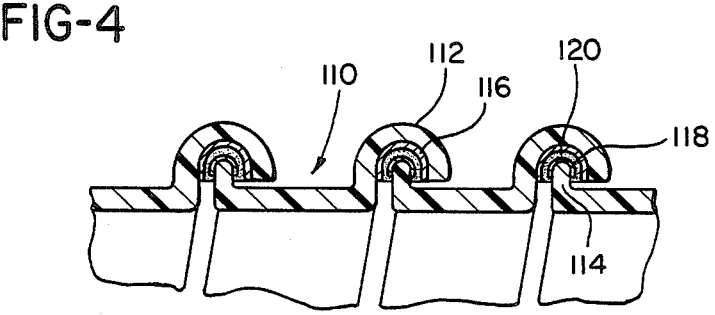
FIG. 4 is a fragmentary sectional view of a hose according to a further embodiment of the invention.

The same principles can be applied in a hose made from only a single elongated member. On hose according to the present invention, as seen in FIG. 4, includes only a single elongated member 110 having a channel 112 along one edge and a ridge 114 along the opposite edge. A layer of buffer material 116 is provided on the interior surface of channel 112, and a further layer of buffer material 118 is provided on ridge 114. The member is wound into a helix by a winding process similar to that discussed above. Bonding material 120 is deposited within channel 112. The action of the buffer material layers is substantially as described above. In a variant of this process, buffer material 118 is provided on ridge 114 but omitted from channel 116. In the reverse process, where the bonding material is first applied to ridge 114 rather than deposited within channel 116, the buffer material on the ridge may be omitted but buffer material 116 should be provided within channel 112.

Polymers other than the ethylene polymers and copolymers referred to above can be employed. Also, different structural materials can be employed for two different members in a multi-member construction such as channel and cap, or for different portions of the same member. Preferably, however, the polymers employed for the bonding, buffer and structural materials should be compatible with one another and adapted to fuse well with one another. In each case, however, the buffer material should be more readily fusible under the influence of heat and pressure than the structural material underlying the buffer material. Thus, the buffer material should have a lower melting point than the structural material, or should be softer, or more preferably, both. Typically, the bonding material is the most readily fusible material in the hose, and ordinarily is selected to have a melting point at or below that of the buffer material. Also, commercial polymeric materials, as well known to those skilled in the art, can contain appreciable quantities of pigments, stabilizers, extenders and other similar.

As these and other variations and combinations of the features described above can be utilized without departing from the present invention, the foregoing description of the preferred embodiments should be taken by way of illustration rather than way of limitation of the invention as described in the claims.

What is claimed is:

1. A hose comprising:
 (a) one or more helically wound elongated members defining a plurality of turns, each of said members have connecting portions extending lengthwise along the member, said connecting portions being juxtaposed with one another at junctions of adjacent turns, at least said connecting portions of said members being formed from one or more polymeric structural materials;
 (b) one or more polymeric buffer materials fused with and at least partially covering the structural material of at least one of said connecting portions each said buffer material being more readily fusible than the structural material covered by the buffer material; and
 (c) a polymeric bonding material having a melting point lower than that of said structural materials disposed between said justaposed connecting portions and bonded to said connecting portions so that said bonding material interconnects said juxtaposed connecting portions, whereby said buffer material is interposed between said bonding material and the structural material of at least one of said connecting portions wherein each said buffer material is disposed in a layer overlying and substantially conforming in shape to the connecting portion covered by the buffer material.

2. A hose as claimed in claim 1 wherein each said layer is less than about 0.030 in. thick.

3. A hose as claimed in claim 1 wherein each said buffer material has a melting temperature lower than the melting temperature of the structural material covered by the buffer material.

4. A hose as claimed in claim 3 wherein each said buffer material is softer than the structural material covered by the buffer material.

5. A hose as claimed in claim 1, wherein said one or more structural materials, said bonding material and one or more said buffer materials all consist essentially of polymers selected from the group consisting of ethylene polymers and ethylene copolymers.

6. A hose as claimed in claim 1, wherein said one or more structural materials consist essentially of polymers selected from the group consisting of high density polyethylene, linear low-density polyethylene and combinations thereof, and said bonding material and said buffer materials consist essentially of polymers selected from the group consisting of ethylene vinyl acetate, ethylene ethyl acrylate and combinations thereof.

7. A hose as claimed in claim 1, wherein each of said members is formed entirely from one of said structural materials.

8. A hose as claimed in claim 1, wherein said members include a generally U-shaped channel member having first and second sidewalls extending generally codirectionally from said base wall, said sidewalls having interior surfaces facing towards one another, and a generally U-shaped cap member having a crown wall and a pair of lateral walls extending generally codirectionally from said crown wall, said lateral walls having interior surfaces facing towards one another, said crown wall having an interior surface facing towards said lateral walls said interior surfaces of said lateral and crown walls cooperatively defining a slot, said members being wound in alternating turns so that the first sidewall of one turn of said channel member and the second sidewall of the neighboring turn of said channel member are received in said slot of each turn of said cap member, with the interior surfaces of said sidewalls facing towards the interior surfaces of said lateral walls, said bonding material being disposed within said slot.

9. A hose as claimed in claim 8, wherein layers of said buffer materials are disposed on both of said sidewalls of said channel member.

10. A hose as claimed in claim 9, wherein each said layer of buffer materials extends over a portion of the interior face of each of said sidewalls of said channel member, remote from said base wall, each said layer of said buffer material being between about 0.002 and about 0.030 in. thick.

11. A hose as claimed in claim 8, wherein a layer of one said buffer material between 0.002 and about 0.030 in. thick is disposed on at least one of said interior faces of at least one of said walls of said cap member.

12. A hose as claimed in claim 1 wherein said one or more structural materials, said one or more buffer materials and said bonding material all incorporate polymers of a common monomer.

* * * * *